Aug. 14, 1945. H. L. HILL 2,382,791
POWER DRIVE FOR WINDOW REGULATORS
Filed May 22, 1943 3 Sheets-Sheet 1

Inventor:
Hillary L. Hill,
by
Emery, Booth, Townsend, Miller Wadner Att'ys

Aug. 14, 1945.   H. L. HILL   2,382,791
POWER DRIVE FOR WINDOW REGULATORS
Filed May 22, 1943   3 Sheets-Sheet 3

Inventor
Hillary L. Hill
by Emery, Booth, Townsend, Miller Wiley
Attys

Patented Aug. 14, 1945

2,382,791

UNITED STATES PATENT OFFICE 2,382,791

POWER DRIVE FOR WINDOW REGULATORS

Hillary L. Hill, Chelmsford, Mass., assignor to A. S. Campbell Co., Inc., East Boston, Mass., a corporation of Massachusetts Application May 22, 1943, Serial No. 487,991

9 Claims. (Cl. 268—124)

This invention relates to window regulators, commonly so-called, that is, mechanisms utilized to open and close sliding panels such as the vertically sliding windows in automobile bodies and in particular those of the doors. The object of the invention is to provide a mechanism for operating the window or the like under electric power and in attaining such object I provide such a mechanism effective and quiet in its operation, simple and compact in its construction, inexpensive to construct and easy to install.

My invention will be well understood by reference to the following description of the illustrative embodiment thereof shown by way of example in the accompanying drawings, wherein—

In the following description I shall attempt to use the words "interior" and "exterior" as relating to the vehicle as a whole while by "inner" and "outer" I refer to the door structure as such. Thus the door may be considered as having an "interior" panel which has an "outer" face presented toward the interior of the vehicle and an "inner" face presented toward the exterior of the vehicle as a whole.

The power operation of the windows of automobile doors is an old idea and many patents have been granted for mechanisms for effecting such power operation. Indeed there are no difficulties from the mechanical or electrical point of view in broadly providing a mechanism which will perform the necessary operations. In practice, however, constructionally and economically the matter is not quite so simple. In the usual construction of an automobile door, for example, at the present time, it embodies an exterior sheet metal panel imperforate below the belt line and apertured to provide a window opening and characteristically this panel is curved in both directions, longitudinally to correspond to the side sweep of the car and vertically because of the turn-under of the lower end and the tumble-home of the upper portion. An interior sheet metal panel permanently assembled provides a box section for the lower portion of the door. Openings cut in the interior panel provide for the access to and the location of various fittings, both in the assembly thereof and in their maintenance and repair, and these openings are covered by an upholstery or trim panel secured at the interior. The window glass must operate in a plane corresponding to chords of the curve of the outer panel and thus the space available for the operation of window operating mechanism to effect its movements in that plane is much restricted. Parts being out of sight and out of mind should require little attention for maintenance. Yet accessibility of such mechanism for such maintenance and repair through the openings in the interior panel is required. Moreover, the door constructed of these panels in spite of various sound-deadening provisions remains a resonant device susceptible to response to mechanical or electrical influences to cause unpermissible noise.

While my invention is not limited thereto in all its aspects, the example here shown provides a unitary sub-assembly for operation with more or less conventional window-raising window regulators proper whereby both manually operated and power operated constructions may be easily produced as alternatives. Thus power operated windows might be offered by an automobile manufacturer as "optional equipment" and the supplying of this optional equipment requires little change in the "standard equipment" constructed for manual operation.

Figure 1:
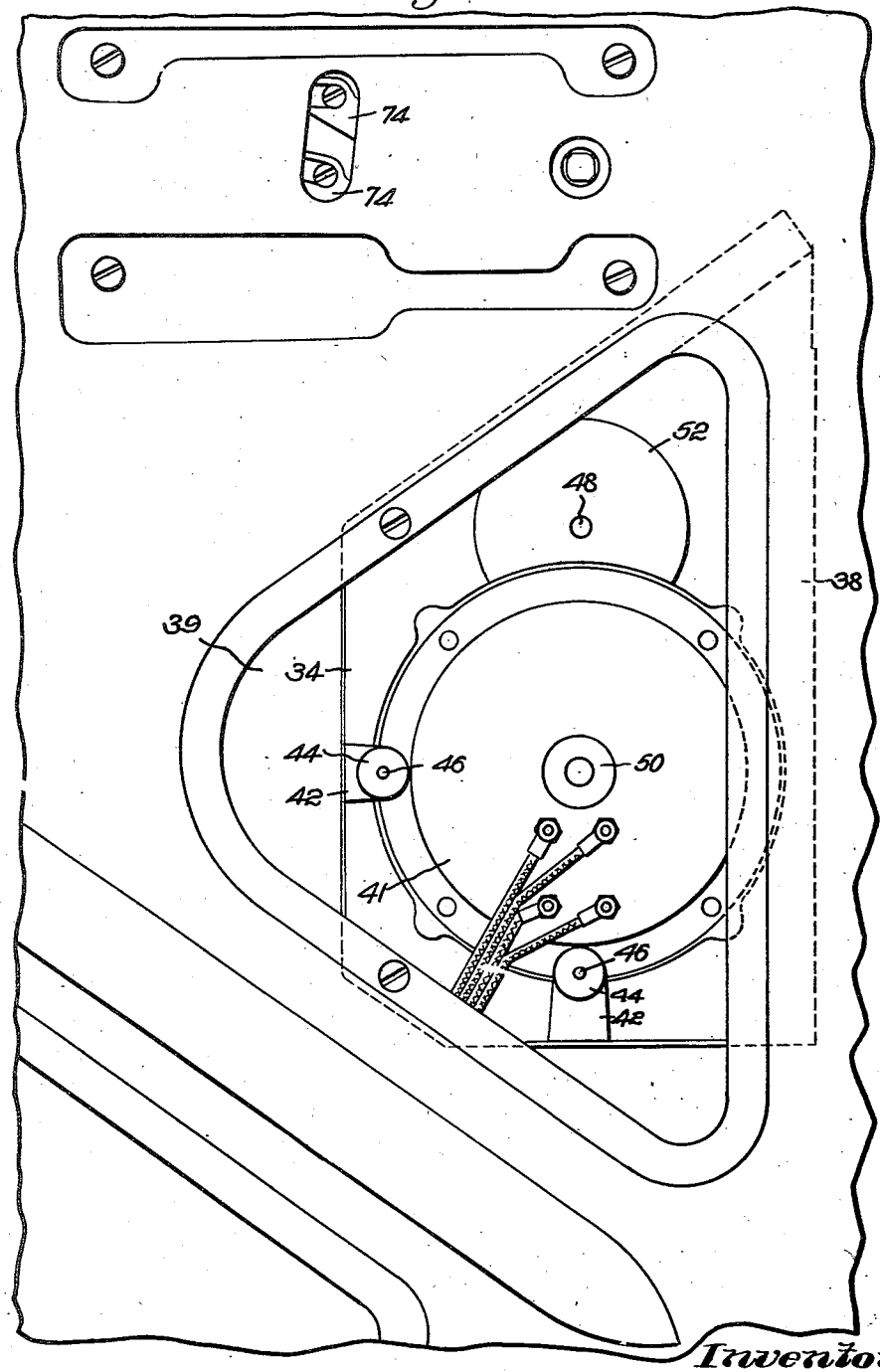
Fig. 1 is an elevation, broken away, of the lower portion of the door as viewed from the interior.
Figure 2:
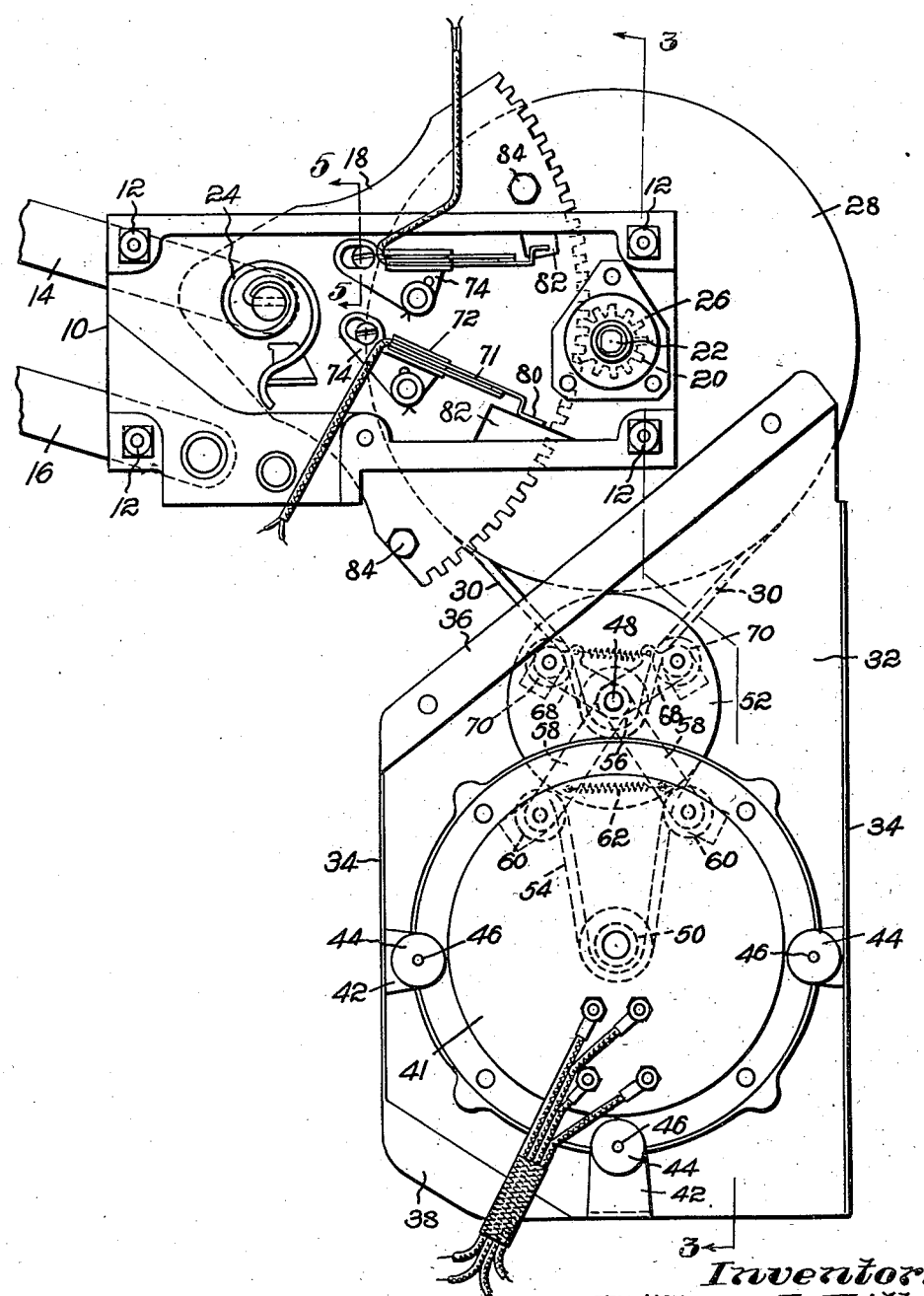
Fig. 2 is an elevation of the parts of the mechanism in the relative positions which they have in Fig. 1, the door structure being omitted.
Figure 3:
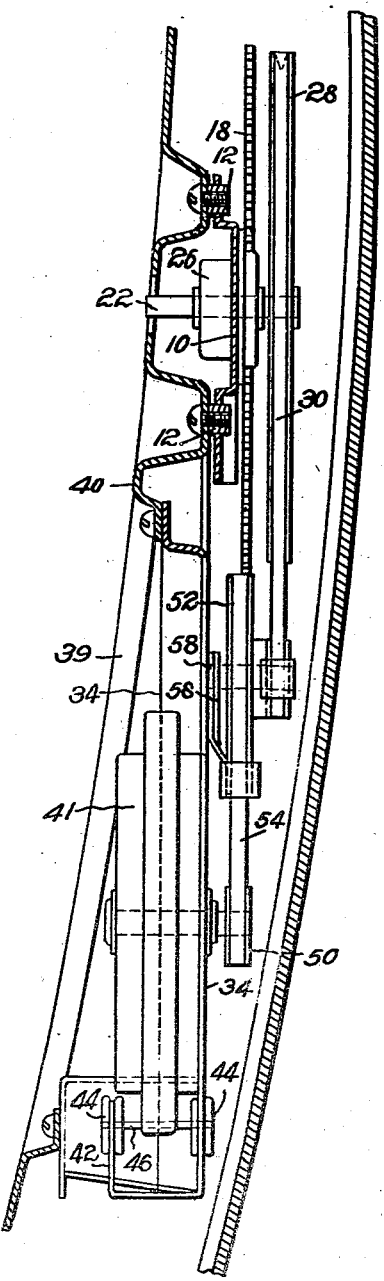
Fig. 3 is a view showing the contour of the door panels along the line 3—3 of Fig. 2 but with the interior mechanism shown in Fig. 2 in side elevation as seen from the right.

Referring to the drawings, in Fig. 2 there is shown a mechanism wherein the mechanical elements which are directly connected to the window for engagement with the same are of known form, the construction being closely similar to that hitherto utilized in the Mercury automobile of the Ford Motor Company, model of 1942, for the front door. The lifting elements are carried by a regulator plate 10 of generally channeled form, as best seen in Fig. 3. The flanges are formed with attaching portions which have mounted therein nuts 12 whereby the plate, after insertion from the interior side of the door through opening 39 (Figs. 1 and 2) of the interior door panel, may be secured to the inner side of that panel by means of screws extending from its outer side. The window is operated by parallel links 14 and 16 pivoted to the blade 10, link 14 having attached thereto a sector gear 18 cooperating with a driving pinion 20 on the transversely extending pinion shaft 22. The weight of the window may be balanced in part in customary manner by a spiral spring 24 about the pivot of the arm 14. The pinion shaft 22 may operate in connection with an irreversible driving device of the general type of that shown in the patent to Heintz 1,552,697 and indicated herein by the housing 26 therefor, this device preventing rotation of the shaft under driving action of the window exerted through the segment while permitting the pinion shaft to be rotated in either direction to drive the pinion. In the case of a hand-operated device the shaft is extended toward the interior, toward the reader in Fig. 1, to receive a hand crank on the outer face of the interior panel. In the present instance it is extended toward the exterior and carries a V pulley or band wheel 28 of comparatively large diameter.

The pulley 28 is driven by a V belt 30 from a unitary sub-assembly which I shall next describe. This assembly comprises a base plate 32, the vertical sides of which are herein shown as provided with stiffening flanges 34 while at the upper and lower ends offset brackets 36 and 38 are provided to permit the plate after insertion through opening 39 (see Figs. 1 and 2) of the interior panel 40 with what may be referred to as a buttonholing motion to be secured to the inner face of said interior panel around the margins of such openings at at least three supporting points to position the body of the plate 32 in spaced relation outward from said panel and, as indicated in Fig. 2, plumbed in a suitable plane relative to the plane of the band wheel 28 and of the window which is operated, the brackets 36 and 38 as seen in Fig. 2 being of different lengths to permit such plumbing relative to the angularly disposed supporting panel.

Mechanisms carried by the plate which I am about to describe are preferably organized between two of the sides thereof, as the vertical sides 34, to permit convenient insertion in the manner just referred to. A reversible electric motor 41 is carried by the plate with its rotor shaft extending in a direction transverse to the plate and to the door structure. To permit such installation of the motor it should be of a form which I may describe as thin and flat, that is, of restricted axial dimension. Its axial length would ordinarily be not more than one-half its diameter and conveniently less. In my copending application, Serial No. 477,695, filed March 2, 1943, I have described in detail one construction of motor which would be suitable, and by way of example I may state that a practical motor constructed as described in said application and adaptable for the present purpose may be 6⅜ inches in diameter and 1½ inches between the outer ends of the rotor bearings and adapted to operate at 1200 R. P. M.

Electrically the motor is preferably of multiple pole construction and of slow speed, the latter being desirable both for mechanical reasons which will appear and to avoid noise commonly associated with small and rapidly running electric motors. To mount the motor on the plate 32 brackets 42 may be provided having arms opposing and spaced from the plate, these arms and the opposite portions of the plate receiving pairs of rubber gaskets 44 which receive in the manner of trunnion pins 46 extending through the field structure of the motor and suspending it in cushioned relation from the plate.

Parallel to the rotor shaft of the motor the plate carries a jack shaft 48. A small driving pulley 50 on the motor shaft is belted to a relatively large band wheel 52 on one end of the jack shaft by a V belt 54 while the other end of the jack shaft carries a small pulley 56 connected by the belt 30 already referred to to the large band wheel 28 on the pinion shaft. There is thus a double reduction of speed between the rotor shaft and the pinion shaft. In the construction shown the plane of pulley 56 is on the end of shaft 48 opposite to that on which lies the motor 41. In certain door constructions the opposite arrangement of the pulleys on the jack shaft could be used.

In Fig. 3 will be noted the restricted dimension of the motor transversely of the window panel which I have already referred to, making it well adapted to be received in the restricted space available. As already intimated, the plate 32 with the mechanism mounted thereon may be slid in through a small opening in the interior panel 40 of the door with a buttonholing action and then secured to the margin of this opening. It is then only necessary to put on the belt 30 to put the parts in condition for mechanical operation.

In view of the limitations of space the centers of the rotor shaft, the jack shaft and the pinion shaft are rather closely adjacent to one another. Thus the arc of contact of the belts on the small driving pulleys is restricted. I herein show suitable belt tightening means to increase the arc of contact, best illustrated in Fig. 4. Referring to the case of the belt 54, there is loosely pivoted on the jack shaft 48 a pair of arms 58 carrying binder pulleys 60 cooperating with the two runs of the belt 54, respectively, and normally drawn together by a spring 62 so that they are pressed together against the belt.

Figure 4:
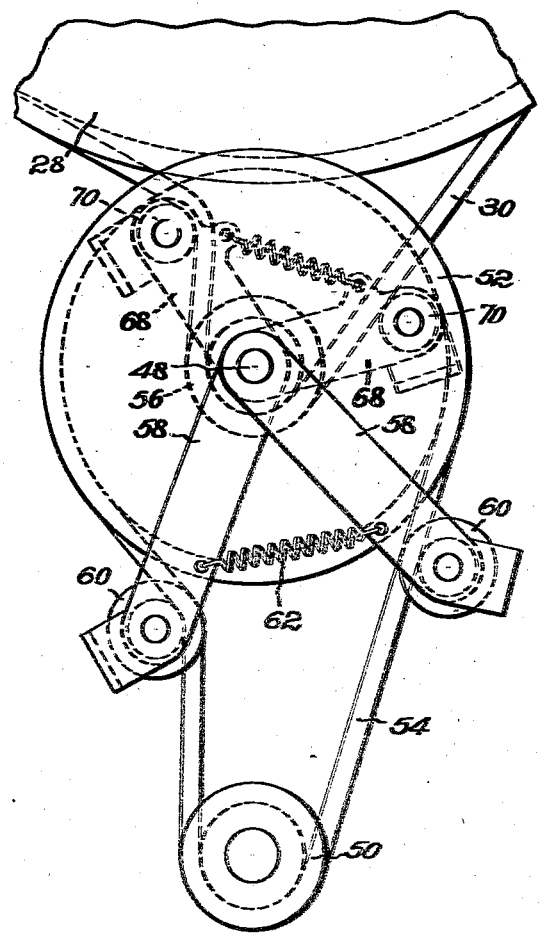
Fig. 4 is an enlarged detail of part of Fig. 2.

Assuming now the motor to be operated in such a direction that the belt travels clockwise, the drive is through the right-hand run in Figs. 2 and 4 which straightens under the resulting tension, as seen in Fig. 4, and thereby the left-hand arm is drawn to the right through the spring, increasing the arc of contact of the belt with the driving pulley 50 at the left-hand side. When the motor is reversed, the left-hand run of the belt straightens and the right-hand binder pulley acts on the right-hand run of the belt to increase the arc of contact. Similar spring pressed arms 68 with binder pulleys 70 cooperate with belt 30 in like manner to increase its arc of contact with the driving pulley 56.

The reversible motor 41 may be operated by a two-way switch normally biased to a neutral center position and operating a reversing relay, such an arrangement not being new in the art, and as it will be understood by all electricians, I have not deemed it necessary to illustrate it.

Figure 5:
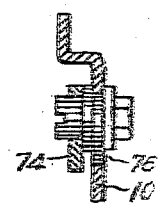
Fig. 5 is an enlarged section on the line 4—4 of Fig. 2.

Limit switches are preferably provided in the motor circuit. Herein (Fig. 2) these may provide spring arms 71, carrying normally closed contacts and mounted on carriers 72 pivoted to the web of the regulator plate 10 to be received and housed within the channel of the same. The carriers (see Fig. 5) have slotted tail portions 74 cooperating with eccentric elements 76 formed on screws tapped into the plate and having screwdriver slots presented toward the interior of the vehicle, toward the reader in Fig. 1, so that they may be conveniently adjusted by means of a screw driver introduced in a hole in the interior panel. In the case of each switch one of the arms 70 is extended distally of the contacts to provide an operating portion 80 presented adjacent one of the cut-away portions 82 in the angle of the channel of the regulator plate to lie in the path of trips in the form of studs 84 carried on the sector gear 18.

While I have in the drawings shown and described the plate 34 which supports the motor and the jack shaft as separate from the regulator plate 32, the connection being made simply by putting on the belt 34, it is apparent that in certain applications the two supporting plates may be merged.

By the construction described I have not only provided for ready assembly of the parts as already noted, but a simple drive from a low-speed motor is permitted through but two reductions of a ratio practicable for belts, and short belts adaptable to the exigencies of space in an automobile body or the like. By virtue of the use of this drive the relative location of the various centers is not critical but may be comparatively rough and no nice fitting or alignment of parts is required. The belt drive is not likely to get out of order and is quiet. The thin flat motor shown is, relatively speaking, unrestricted in its diametrical dimension and thus ample metal may be provided in the field cores so that stray lines of force are not likely to affect the metal panels to set them in vibration as the electrical forces in the field vary during the operation of the motor.

I am aware that the invention may be embodied in other specific forms without departing from the spirit or essential attributes thereof, and I therefore desire the present embodiment to be considered in all respects as illustrative and not restrictive, as is in fact clear in several matters from the description itself. Reference is to be had to the appended claims to indicate those principles of the invention exemplified by the particular embodiment described and which I desire to secure by Letters Patent.

I claim:

1. A power-actuating unit for an automobile window regulator comprising a base plate having attaching brackets projecting adjacent two ends thereof between the sides, a thin flat motor carried by the plate with its axis transverse thereto, a drive pulley on the motor, a jack shaft on the plate parallel to said axis having a driven pulley belted to said driving pulley and a driving pulley adapted to be belted to the pinion shaft of the regulator, said mechanism being organized entirely within the space bounded by said two sides of the plate whereby the unit may be passed with endwise buttonholing motion through an opening in an interior door panel and secured marginally thereof.

2. A power-actuating unit for an automobile window regulator comprising a base plate having marginal ears extending from one face thereof and terminating in attaching pads differentially spaced from the plane of the plate by which the plate may be suspended in a plane substantially parallel to the window from the portion of the interior panel of the door beneath the portion corresponding to the garnish rail, a thin flat motor mounted on the plate, a drive pulley on the motor, a jack shaft on the plate parallel to said axis having a driven pulley belted to said driving pulley and a driving pulley adapted to be belted to the pinion shaft of the regulator.

3. A power-actuating unit for an automobile window regulator comprising a base plate having stiffening flanges along two side, brackets extending from the ends between the sides, a thin flat motor carried by the plate on the flanged face thereof with its axis transverse thereto, a drive pulley on the motor, a jack shaft on the plate parallel to said axis having a driven pulley belted to said driving pulley and a driving pulley adapted to be belted to the pinion shaft of the regulator, said mechanism being organized entirely within the space bounded by said two sides of the plate whereby the unit may be passed with endwise buttonholing motion through an opening in an interior door panel and secured marginally thereof.

4. In an automobile body part having a vertically sliding window, a lifting lever therefor with a sector gear, a pinion cooperating with the gear having a shaft transverse to the body part, a pulley on the shaft, a thin flat electric motor housed between the inner and outer panels of the body part with its rotor shaft transverse thereto, a driving pulley on said shaft, a jack shaft parallel to said axis, and a pair of V belts connecting said jack shaft to the rotor shaft and pinion shaft respectively and providing reductions of speed.

5. In automobile window mechanism of the type wherein a sliding closure received between exterior and interior panels of the automobile body is reciprocated to and from a position wherein it closes an opening therethrough by means of a regulator mechanism actuated by a driving pinion the combination wherein the shaft of said pinion carries a pulley which is power driven from a mechanism comprising an extended plate received between said panels in generally parallel relation thereto, an electric motor mounted on the plate to be housed therewith between the panels with its axis extending transversely of the plate, a jack shaft extending parallel to said axis and a frictional speed-reducing train comprising V belts to connect respectively the motor rotor and the jack shaft and the jack shaft and the pinion pulley.

6. An electrically energized actuating mechanism for an automobile window regulator of the type wherein actuating links connected to the glass are operated from a driving pinion for reciprocating the glass, said mechanism being adapted for connection to a pulley on the shaft of such pinion and comprising an extended base plate for reception between the panels of the automobile body in generally parallel relation to such panels, an electric motor mounted on the plate to be housed therewith between the panels with its axis extending transversely of the plate, a jack shaft extending parallel to said axis and a frictional speed-reducing train comprising V belts to connect respectively the motor rotor and the jack shaft and the jack shaft and the pinion pulley.

7. A power-actuating unit for an automobile window regulator comprising a base plate having attaching brackets projecting adjacent two ends thereof between its sides, the plate supporting a thin flat motor and a belt wheel driven from the motor with their axes transverse to the plate, the belt wheel being adapted to be belted to the actuating shaft of the regulator, said mechanism being organized entirely within the space bounded by said two sides of the plate whereby the unit may be passed with endwise buttonholing motion through an opening in an interior door panel and secured marginally thereof.

8. A power-actuating unit for an automobile window regulator comprising a base plate having marginal ears extending from one face thereof and terminating in attaching pads differentially spaced from the plane of the plate by which the plate may be suspended in a plane substantially parallel to the window from the portion of the interior panel of the door beneath the portion corresponding to the garnish rail, said plate supporting a thin flat motor and a belt wheel driven thereby with their axes transverse to the plate, said wheel adapted to be belted to the actuating shaft of the regulator.

9. A power-actuating unit for an automobile window regulator adapted to be belt-connected to the actuating shaft of the regulator comprising a base plate having attaching brackets adjacent its periphery whereby it may be suspended from an interior door panel at the margins of an opening therein, a thin flat motor and a belt wheel driven thereby disposed with their axes transverse to said plate, supporting means on the plate having cushioned engagement with the outer portion of the motor for suspending it from the plate at the interior side thereof and within its projected outline.

HILLARY L. HILL.